DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 240

T878,007
PHOTOGRAPHIC SILVER BLEACH REPLENISHING SOLUTION

Robert S. Walsh, 1669 Lake Ave., Rochester, N.Y. 14650

Filed Jan. 29, 1970, Ser. No. 6,941
Int. Cl. C03c *5/32*
U.S. Cl. 96—60
No Drawing. 2 Pages Specification

A concentrated solution of sodium ferricyanide useful as a silver bleaching replenisher solution in photography is prepared by oxidizing sodium ferrocyanide with hydrogen peroxide in the presence of hydrobromic acid and phosphoric acid. The solution is more concentrated than is obtainable with potassium ferricyanide.